(12) United States Patent
Goud et al.

(10) Patent No.: US 8,386,241 B2
(45) Date of Patent: Feb. 26, 2013

(54) SYSTEMS AND METHODS FOR AN AUTOMATED PERSONALIZED DICTIONARY GENERATOR FOR PORTABLE DEVICES

(75) Inventors: Corneil John Goud, Alberta (CA); Roland Emlyn Williams, Martinez, CA (US); William James Templeton-Steadman, Herts (GB)

(73) Assignee: Zi Corporation of Canada, Inc., Calgary (CA)

( * ) Notice: Subject to any disclaimer, the term of this patent is extended or adjusted under 35 U.S.C. 154(b) by 0 days.

(21) Appl. No.: 13/434,730

(22) Filed: Mar. 29, 2012

(65) Prior Publication Data

US 2012/0185239 A1      Jul. 19, 2012

Related U.S. Application Data

(63) Continuation of application No. 12/135,142, filed on Jun. 6, 2008, now Pat. No. 8,180,630.

(51) Int. Cl.
*G06F 17/21* (2006.01)
*G06F 17/20* (2006.01)
*G06F 17/27* (2006.01)

(52) U.S. Cl. .................................. 704/10; 704/1; 704/9

(58) Field of Classification Search .................. 704/1, 9, 704/10
See application file for complete search history.

(56) References Cited

U.S. PATENT DOCUMENTS

| 5,696,962 | A | * | 12/1997 | Kupiec .................................. 1/1 |
| 6,011,554 | A | | 1/2000 | King et al. |
| 6,061,675 | A | | 5/2000 | Wical |
| 6,212,494 | B1 | | 4/2001 | Boguraev |
| 6,735,559 | B1 | * | 5/2004 | Takazawa .......................... 704/7 |
| 6,782,510 | B1 | | 8/2004 | Gross et al. |
| 7,490,033 | B2 | | 2/2009 | Chen et al. |
| 7,580,831 | B2 | | 8/2009 | Haskell et al. |
| 7,912,700 | B2 | | 3/2011 | Bower et al. |
| 2002/0082868 | A1 | | 6/2002 | Pories et al. |
| 2005/0004874 | A1 | | 1/2005 | Gilmour et al. |
| 2006/0259543 | A1 | | 11/2006 | Tindall |
| 2007/0100650 | A1 | | 5/2007 | Ramer et al. |
| 2007/0100653 | A1 | | 5/2007 | Ramer et al. |
| 2007/0100806 | A1 | | 5/2007 | Ramer et al. |
| 2007/0168354 | A1 | | 7/2007 | Ramer et al. |

* cited by examiner

*Primary Examiner* — Jesse Pullias

(74) *Attorney, Agent, or Firm* — Michael A. Glenn; Glenn Patent Group

(57) ABSTRACT

A system and method for automated dictionary population is provided to facilitate the entry of textual material in dictionaries for enhancing word prediction. The automated dictionary population system is useful in association with a mobile device including at least one dictionary which includes entries. The device receives a communication which is parsed and textual data extracted. The text is compared to the entries of the dictionaries to identify new words. Statistical information for the parsed words, including word usage frequency, recency, or likelihood of use, is generated. Profanities may be processed by identifying profanities, modifying the profanities, and asking the user to provide feedback. Phrases are identified by phrase markers. Lastly, the new words are stored in a supplementary word list as single words or by linking the words of the identified phrases to preserve any phrase relationships. Likewise, the statistical information may be stored.

16 Claims, 16 Drawing Sheets

SYSTEMS AND METHODS FOR AN AUTOMATED PERSONALIZED DICTIONARY GENERATOR FOR PORTABLE DEVICES

CROSS REFERENCE TO RELATED APPLICATIONS

This application is a continuation of U.S. patent application Ser. No. 12/135,142, filed Jun. 6, 2008, which is currently allowed, which application is incorporated herein in its entirety by this reference thereto.

BACKGROUND OF THE INVENTION

This invention relates generally to generation of a personalized dictionary for portable devices. More particularly, the present invention relates to a method for populating a personalized dictionary in a semi automated fashion. This is achieved through the analysis of communication messages written, spoken, sent or received on the portable device. Text may include any written characters, or transcriptions of verbal messages. Such text or verbal message may include text using Roman based alphabets, Chinese alphabet, Arabic scripts, or virtually any known language's symbology.

In today's increasingly mobile population, the ability to input text into a mobile device is becoming more desirable. Emails, appointments and text messages are routinely inputted into mobile devices, including Personal Digital Assistants (PDA's), cell phones and computerized organizers.

For the business person, the ability to send emails and document appointments, while on the go, enables a jumpstart into the workday, increased productivity and enhanced flexibility. For the teenage, or other casual user, text messaging has become an exceedingly common phenomena and a form of social currency.

Mobile devices typically have less processing power and storage resources available than a stationary computer system. Additionally, due to the small size of these personal appliances, keypads are typically very small or require multiple keytaps. This small, highly portable size of the devices that enable mobile text connectivity also render the input of such text onerous.

In response, typical personal portable appliances may include utilities that facilitate the generation or entry of textual material for messaging purposes. In general, these utilities may be one of several types, or some combination, including: i) systems which allow a user to enter text letter by letter using a scheme where a letter on a key is specifically identified in a deterministic fashion commonly called multi-tap systems, and ii) systems which match sequences of keys to word possibilities either algorithmically or by matching pre-stored dictionary entries, and iii) fully deterministic systems having a one to one correspondence to desired symbols such as a full keyboard, albeit miniaturized. These latter systems, of course, allow complete flexibility of symbol string entry.

In all of these systems, considerable benefit may be realized by providing the user with candidate words for selection by the user prior to completion. Particularly for long words, this predictive presentation of candidate words may save the user considerable typing time and keystrokes. Ordered dictionaries may be used to supply candidates and, given a well populated dictionary, results can be very good for many applications.

As noted, result quality is a strong function of the dictionary ordering strategy, so considerable effort is required to tune system performance so that the user experience is satisfactory. Poor candidates are a distraction rather than a benefit for the user, thus well populated dictionaries are a virtual necessity.

However, due to storage limitations in these portable devices, the dictionaries relied upon are necessarily not exhaustive word lists. Additionally, even were one able to have an exhaustive dictionary, querying such a database would be impractical for real time word candidate prediction, particularly for personal devices with limited processing ability.

As such, in typical systems, there are three essential components to the dictionary. The first is a static dictionary which is formulated from a substantial corpus in the target language. Such static dictionaries may additionally be referred to as a static element, base dictionary, first dictionary or static word list. In the initial use of the appliance, the performance of the utility is dominated by this static element. Although such a static dictionary may be changed in some modern appliances, such static dictionaries are, at best, quasi-static since changing content may confuse or distract the user and may confound manufacturer support activities.

The second dictionary component is a used word listing that may have an associated ordering algorithm. Such a used word list may additionally be referred to as a used word dictionary, usage dictionary, second dictionary or common word list. Whenever a user creates a message, words used in message creation are added to a dictionary that stores used words. This used word dictionary is helpful in that words and text constructs peculiar to that user are saved. Since a user tends, by and large, to use words and structures that have become habitual, and thus personal to the user, intended words may be predicted based upon the usage patterns established. This is believed to speed system response, generally, since users tend to re-use certain words and it is far better to keep a separate entry list than to attempt to manage the full dictionary; again system support is eased if the primary dictionary is kept fairly static.

A third list may be present that allows a user to create words that may be absent from the primary dictionary. Such a third list may additionally be referred to as a supplemental element, supplemental dictionary, third dictionary or supplemental word list. The supplemental dictionary allows preservation of the root dictionary whilst permitting a personal list of items, such as proper names or terms of art, relevant to a particular user to be stored.

Currently the population of the used word list and supplemental dictionary may require the user to input many words in full. That is, the user may be required to type in an entire word, often requiring the user to switch input modes to a deterministic input. Switching input modes may inconvenience the user, slow down messaging, and generally reduce efficiency and usability of the portable device. This inconvenience additionally occurs at a time when the dictionaries are sparsely populated, thus rendering generation of predictive candidates words limited, or worse, erroneous.

Another current method of addressing such an issue is to attempt to preload dictionary sets so that the user has fewer words to manually input. This has been met with mixed success, since such predetermined lists are very costly and difficult to compile, and are often non-reflective of what terms and words the user desires to use.

Thus, in the typical mobile device, the current lack of rapid dictionary population may be inadequate as requiring too much manual attention from the users, or requiring too much storage for exhaustive dictionary sets. Manufacturers and retailers of mobile devices would benefit greatly from the ability to offer devices with accurate and rapid dictionary word population. Additionally, users of these mobile devices would benefit greatly by having reduced aggravation and more efficiency when initially inputting text on the mobile device.

The current invention aids in automating, at least in part, the creation of the supplemental dictionary. A considerable benefit is that caller name records may be built rapidly as may be terms of art, thus freeing the user from the laborious task of creating each entry one by one.

It is therefore apparent that an urgent need exists for an improved system and method for automated dictionary population that is both accurate and efficient. This solution would replace current practices of making the user deterministically input each unknown word with a more efficient and rapid system with regards to mobile devices; thereby increasing effectiveness and general usability of text input performed on a mobile device.

SUMMARY OF THE INVENTION

To achieve the foregoing and in accordance with the present invention, a method and system for automated dictionary population is provided. Such a system is useful for a user of mobile devices to efficiently produce text data yet avoid much of the laborious task of deterministically entering every new word for storage and future use.

The mobile device, or personal appliance, may include at least one dictionary which includes entries. Every time the device receives a communication intended for the user, the information may be parsed and textual data extracted. The text is then compared to the entries of the dictionaries to identify new words. Statistical information may be generated for the parsed words. This information includes word usage frequency, recency, or likelihood of use.

Profanities may be processed by identifying profanities within the parsed words by comparing the parsed words to a profanity word list, modifying the profanities by replacing at least some of the profanity with a place marker and displaying the modified profanity to a user in a candidate list. Then the user may be asked to provide feedback either selecting or deselecting the profanity. Selecting the profanity results in displaying the profanity to the user and storing the profanity. De-selecting the profanity removes the profanity from the candidate list.

Phrases from the parsed words may be identified by phrase markers, which may include at least one of italicized word groups, quoted word groups, bolded word groups, capitalized word groups, word groups containing more than one new word, and groups of words including joining words.

Lastly, the new words may be stored in a supplementary dictionary or word list. These words may be stored as single words or may be stored utilizing linking the words of the identified phrases to preserve any phrase relationships. This is valuable in the case of certain professions where a phrase may be a term of art and the individual words may be less useful when used alone. Likewise, the statistical information may be stored.

By using communicated data in this way, pertinent material may be gleaned without deliberate user activity. This results in a rapid accumulation of words and terms beyond those found in the static dictionary or word list, which words are personal to that user by virtue of having been used in exchanges. Names may also be marked as special and related to other directories.

Voice data may also be processed and harvested for word samples in the same way. In at least one application, voice messages may be machine converted to textual form external to the mobile appliance and submitted to the appliance using the GSM short message service or similar service.

When coupled with word prediction or completion methods, the stored data harvested in these ways allows relevant candidates to be shown to the user more frequently than those extracted from a static dictionary constructed from corpora having a broader or more general statistical bias. Moreover, by combining words that are related to form phrases, it has been found that a substantial improvement in the candidate quality and a reduction in required keystrokes is usual.

These and other features of the present invention may be practiced alone or in any reasonable combination and will be discussed in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

Introduction

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to semi automated dictionary population system and method to provide fast and efficient dictionary generation and personalization for mobile devices (also known as a personal appliance). More particularly, the present invention relates to a method for dictionary population that requires fewer storage resources and less distracting inputs from the user.

In current systems, each time a user wishes to use a word that is not a part of the root dictionary the new word must be created and stored. Generally when a non-deterministic keyboard is used, a user must interrupt the task at hand and enter the new word in some deterministic fashion. In a typical appliance such as a cellular telephone, it may mean that a user will have to change entry modes to use a multi-tap scheme to create this new word. By using alternate sources of information to supplement a user's dictionary, such as that which is disclosed by the present invention, a significant improvement may be realized over the old systems.

II. Automated Dictionary Population System

Figure 1:
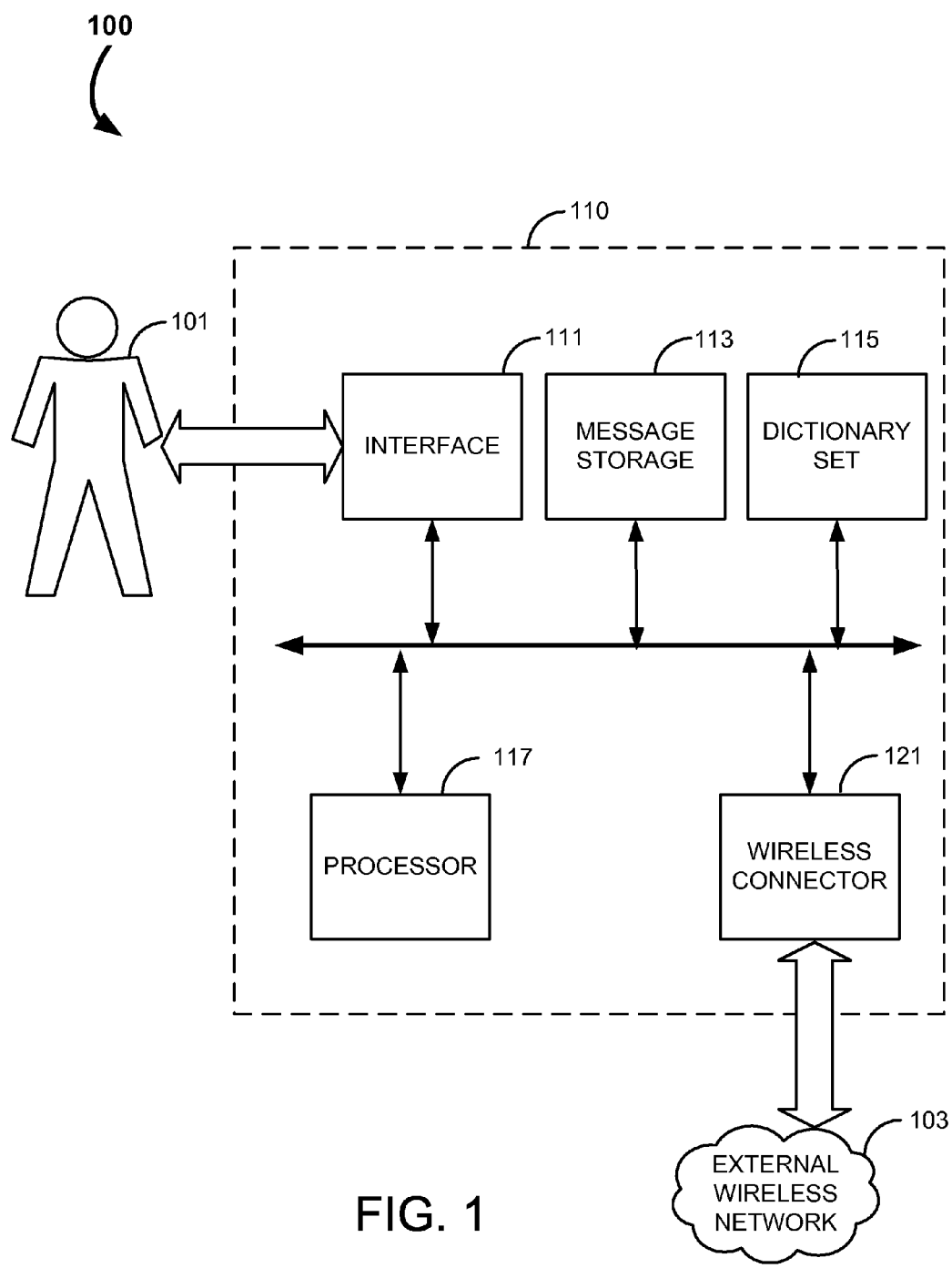
FIG. 1 shows a logical block diagram of an automated dictionary population system in accordance with an embodiment of the present invention.

To facilitate discussion, FIG. 1 shows a logical block diagram of an Automated Dictionary Population System 100. The Automated Dictionary Population System 100 may include a User 101 which interacts with a Dictionary System 110.

Additionally, the Dictionary System 110 may, in some embodiments, interface an External Wireless Network 103. The Dictionary System 110 may, in some embodiments, provide population of dictionaries.

The Dictionary System 110 may include an Interface 111, a Message Storage 113, a Dictionary Set 115, a Processor 117 and a Wireless Connector 121. The Interface 111 may enable the User 101 to interact with the Dictionary System 110. Likewise, the Wireless Connector 121 may enable the Dictionary System 110 to access the External Wireless Network 103.

The External Wireless Network 103 may include a Wide Area Network (WAN) such as the internet, a cellular phone network, another device such as one's personal computer, or any desired data source. Typically, in some embodiments, the External Wireless Network 103 may enable the transfer of text data from the Dictionary System 110 to other devices for delivery to the intended recipients.

Dictionary System 110 may be contained within a mobile device such as a Personal Digital Assistant (PDA), cellular phone, computerized organizer, personal computer, Blackberry or similar device, as is well known by those skilled in the art. While the disclosed invention is, in some embodiments, shown for use by mobile devices, the present invention is not intended to be limited to devices that are mobile. For example, in some embodiments, the present invention may be utilized upon a standard desktop computer, cash register, land line telephone, or any text capable device.

Additionally, in some embodiments, the User 101 is not required for the Automated Dictionary Population System 100. For example, if the Dictionary System 110 receives text data from the External Wireless Network 103, the Dictionary System 110 may perform dictionary population without receiving input from the User 101.

Interface 111 may be a keypad, touch screen, stylus pad, or any input device. Additionally, in some embodiments, Interface 111 may also provide an output such as a screen or sound output. Alternate systems of input and output may be utilized by the Interface 111 as is well known by those skilled in the art. The Interface 111 facilitates input from the User 101 to the Processor 117.

Messages provided by the User 101 through the Interface 111 may be stored by the Message Storage 113. Also, messages received by the mobile device from the External Wireless Network 103 via the Wireless Connector 121 may, likewise, be stored by the Message Storage 113. The Message Storage 113 may additionally be referred to as an 'inbox' or similar term. The Message Storage 113 is of finite size, although that size may be very large in a modern mobile device. Messages may be deleted when the User 101 has no further need of them or may be deleted automatically when a time limit is reached. Regardless of the actual mechanism, Message Storage 113 contents may be regarded as temporary in nature.

It may be possible, in some embodiments, to perform dictionary population upon receipt of the message and thereby minimize or eliminate the need for the Message Storage 113. However, in some alternate embodiments, particularly when the message is one received from the External Wireless Network 103, such as an email, it may be desirous to delay database population until the User 101 reads the message and is available to provide feedback if necessary. An additional benefit is realized by retaining the message received in that a response to any particular email, for example, may be biased toward the language and word use in that received message.

Much of the discussion contained herein will refer to text as words containing letters from the Roman alphabet. The discussion and examples utilizing Roman alphabet letters is purely exemplary in nature. The present invention is intended to also extend to alternate languages where symbols, glyphs or characters are strung together to produce text. For example, in Chinese a particular string of traditional ideographic symbols, known as the Zhuyin or BoPoMoFo alphabet, may be compiled as to create a character. In Japanese, beyond the ideographic Kanji characters lie a pair of syllabaries called the Kana, and these too are covered by the present invention. Likewise, the present invention may extend to standard Romanization systems, such as Pinyin for Mandarin. It will be seen that the exemplified system and method for dictionary generation is versatile enough to apply not only to Roman alphabets, but any language's symbology.

Likewise, much of the present discussion contained herein will refer to messages as written text. The discussion and examples utilizing written text is purely exemplary in nature. The present invention is intended to also extend to any communication medium including voice, embedded audio in video feeds, email and text messages. For example, increasingly when a user is unavailable to take a voice call, instead of simply recording the caller's message, services are now provided whereby the recorded voice may be rendered as a short text message and relayed to the recipient. Such commercial services are offered by SpinVox and described in their corporate description. This has the considerable benefit to the user in that relevant information may be quickly available without the attendant interruption of the voice call. This invention may monitor the short text message storage such as the 'inbox' and after extracting words that are not already found in the dictionary structure may add them to the dictionary structure.

The Dictionary Set 115 may include the static root, or first, dictionary as well as user populated dictionaries, including the supplemental word list, i.e. the dictionaries being populated by the present invention. The supplementary word lists may be stored as a single list which may be considered to be a 'used word' list. Otherwise, these supplementary word lists may be stored as one or more separate word lists, each having a reference entry that allows access to these particular lists only during text exchanges which use at least some of the terms or words stored therein. Thus, for example, a message sent to John Smith could search not only the main dictionary and the personal word list, but also a used word list and a list of words used in messages received from John Smith. In some implementations, a list of all received words is kept and is accessible from any application where text entry is used. Details of the architecture of the Dictionary Set 115 will be provided below.

Duplication of words is wasteful; storing the same word more than once outside the main dictionary is not necessary. However, by storing a duplicate word or reference to a word outside the main dictionary, an advantage is that the word is accessed earlier because it has become more frequently used than might be implied from the main dictionary. It is thus beneficial to store pointers to words in order to control memory usage, and also allowing phrases to be constructed by directing to particular words regardless of their actual location.

The Processor 117 may perform the analysis and computations required to populate the Dictionary Set 115. Upon initial startup, the Processor 117 may sequentially read each message and extract every word contained in these messages. This extracted word list is then stored as a supplementary dictionary list in the Dictionary Set 115. Each time thereafter, when a message is received, the text from that received message is extracted and parsed and the words are added to this dictionary. In some cases, words will be repeats of those already stored in the main dictionary. Details of the architecture of the Processor 117 will be provided below.

In the GSM short message service (SMS) there are several methods of handling received messages. Normal messages which contain displayable text may be presented for the User 101 on command, and read in the normal fashion. Other messages may be sent which contain machine level instructions for the receiving device and allow User 101 action to cause certain transactions that are not normal messaging transactions. This invention is mainly concerned with readable messages intended for the User 101. It is also the case that electronic mail has the same essential characteristics; and, in fact, any messaging application can be treated in the same way by the Automated Dictionary Population System 100.

When a message is opened to be read by the User 101, the message may be parsed and a temporary list of words may be created. Each word is tested to see if it is already stored in the used word dictionary. Since there is no need to duplicate the word if it has already been stored in the used word dictionary, such repeat words may be discarded. If a word is not found in the used word dictionary, it may be appended to the list so that the list extends downwards with the last entries at the end. This feature may be beneficially used to search recent entries.

In some embodiments, the Automated Dictionary Population System 100 may be enabled to group phrases so that components of terms of art may be stored. Especially, medical terms and legal terms routinely use word groups; as an example, consider terms such as res ipsa loquitur and mutatis mutandis where neither term is best stored as separate parts. Although each term may be fabricated from a string of single words, it is advantageous if the words that make up the terms are linked. Medical terms are notoriously lengthy and similarity between words may convey entirely the wrong information. In this case, linkage between words may be even more beneficial.

Figure 2:
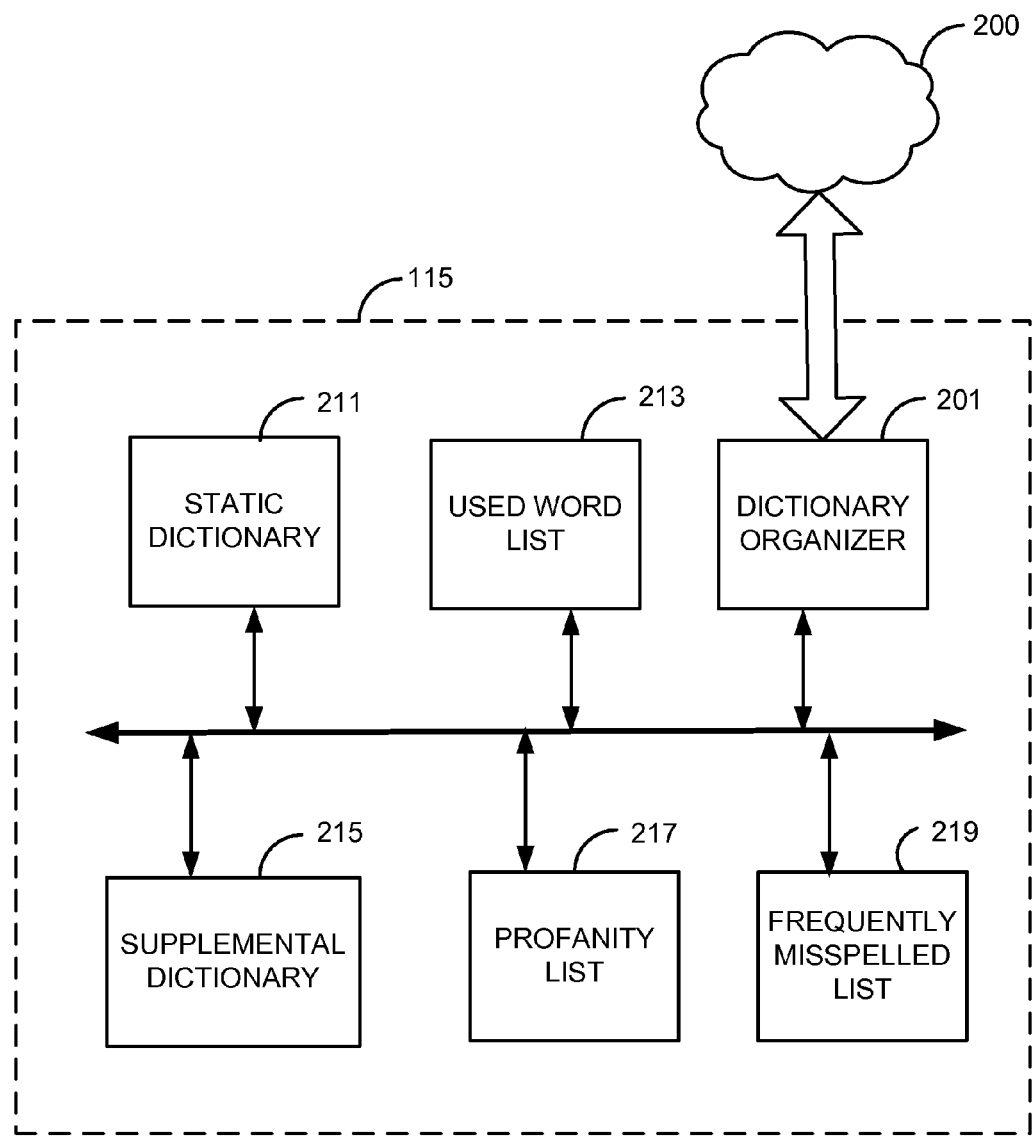
FIG. 2 shows a logical block diagram of a dictionary set for the automated dictionary population system of FIG. 1.

FIG. 2 shows a logical block diagram of the Dictionary Set 115 for the Automated Dictionary Population System 100 of FIG. 1. The Dictionary Organizer 201 may provide organization for the Dictionary Set 115 as well as coupling the Dictionary Set 115 to the other components of the Dictionary System 110, as illustrated by a Cloud 200. The Dictionary Set 115 may also include a Static Dictionary 211, a Used Word List 213, a Supplemental Dictionary 215, and a Profanity List 217. In some embodiments, more or fewer dictionary partitions may be included within the Dictionary Set 115. Likewise, each dictionary within the Dictionary Set 115 may be further subdivided into sub-dictionary lists. For example, as previously noted, the Supplemental Dictionary 215 may be divided into multiple supplemental word lists, accessible only when addressing a particular recipient or when discussing terms found in such a list.

The Static Dictionary 211 may be referred to as the first dictionary, root dictionary, original dictionary, or base word list. The content of Static Dictionary 211 is typically preloaded by the manufacturer of the mobile device. Also, the Static Dictionary 211 is typically not amendable by the User 101. The Static Dictionary 211 may be formulated from a substantial corpus in the target language, and may contain any number of words, dependent upon manufacturer desires and availability of storage resources. However, in many current mobile devices, the Static Dictionary 211 may include a corpus of approximately 10,000 to 100,000 words on average.

The Used Word List 213 may be populated by words that have been used by the User 101 or received by the Dictionary System 110 via the External Wireless Network 103. The Used Word List 213 may then be appended as additional words are received. The Used Word List 213 may have an associated ordering algorithm. In some embodiments, words are not duplicated within the Used Word List 213 and Static Dictionary 211. Instead, a reference is placed within the Used Word List 213 to the word found in the Static Dictionary 211. Likewise, multiple usages of particular words will not result in duplication within the Used Word List 213, but rather, each word within the Used Word List 213 may include a counter to track frequency of use. Such usage tracking may be utilized to provide predictions of words to the User 101 during message composition. Frequency and Recency are the two elements that may be used to force an order to the assorted lists. These two elements are both embodied in the concept of 'likelihood'. Usage frequency need not be any absolute numerical value. In some embodiments, it suffices to store data representative of relative frequency. In the minimal form, list ordering may be used to imply relative frequency. Moreover, since recency is also a valuable index of likelihood, this too may be used as a parameter.

The Supplemental Dictionary 215, as used in this application, may be a particular type of used word list. As such, in some embodiments, the Used Word List 213 and Supplemental Dictionary 215 may, in fact, be one and the same. However, due to the particular structure desired for the Supplemental Dictionary 215, in some embodiments, it has been distinguished as a separate component of the Dictionary Set 115. For example, it may be beneficial to separate the organization of certain words based on the symbol set or font detail. The Supplemental Dictionary 215 enables preservation of the Static Dictionary 211 whilst permitting a personal list of items such as proper names or terms of art relevant to a particular User 101 to be stored. The method of dictionary population disclosed by this invention involves the generation and promulgation of the Supplemental Dictionary 215.

The Supplemental Dictionary 215, as noted, may be stored as a single list. Otherwise, the Supplemental Dictionary 215 may be stored as one or more separate word lists each having a reference entry that allows certain ones of these lists to be accessed only with text exchanges which use these terms or words.

The Dictionary Set 115 may also include a Profanity List 217. The Profanity List 217 enables profanities and expletives to be identified. Profanities may be determined by community, or target consumer standards. Profanities may include words and phrases native to the user's language, as well as commonly used slang or foreign profanities. In some embodiments, context of the word may likewise be analyzed to determine if its usage is deemed profane. The Automated Dictionary Population System 100 may then resolve the use of the profanity whereby the User 101 is not overly inconvenienced, or offended.

The Dictionary Set 115 may also include a Frequently Misspelled Word List 219. The Frequently Misspelled Word List 219 enables identification of misspelled words so that these words are not used to populate the dictionary. Although, not addressed specifically by this invention, the difficulty caused by improper spelling may be resolved through the use of the Frequently Misspelled Word List 219 and dictionary error distance calculations. Error distance may be calculated for words, and those which have low error distances may be used to estimate which candidates are most likely to have been intended. Although this may prove disruptive to a user in the early stages, a simple query may be presented that allows the removal of erroneously stored words. This may be resolved simply by marking the word or word group when they are retrieved as candidates. For example the misspelled word receive would appear italicized or otherwise distinguished in addition to the correctly spelled word. Selection of a seemingly misspelled word would confirm its probable valid status and promote its likelihood of retrieval whereas non-selection would demote it. Automatic removal is possible but must be approached with great care. Capitalized words, in some embodiments, should not be routinely eliminated.

Figure 3:
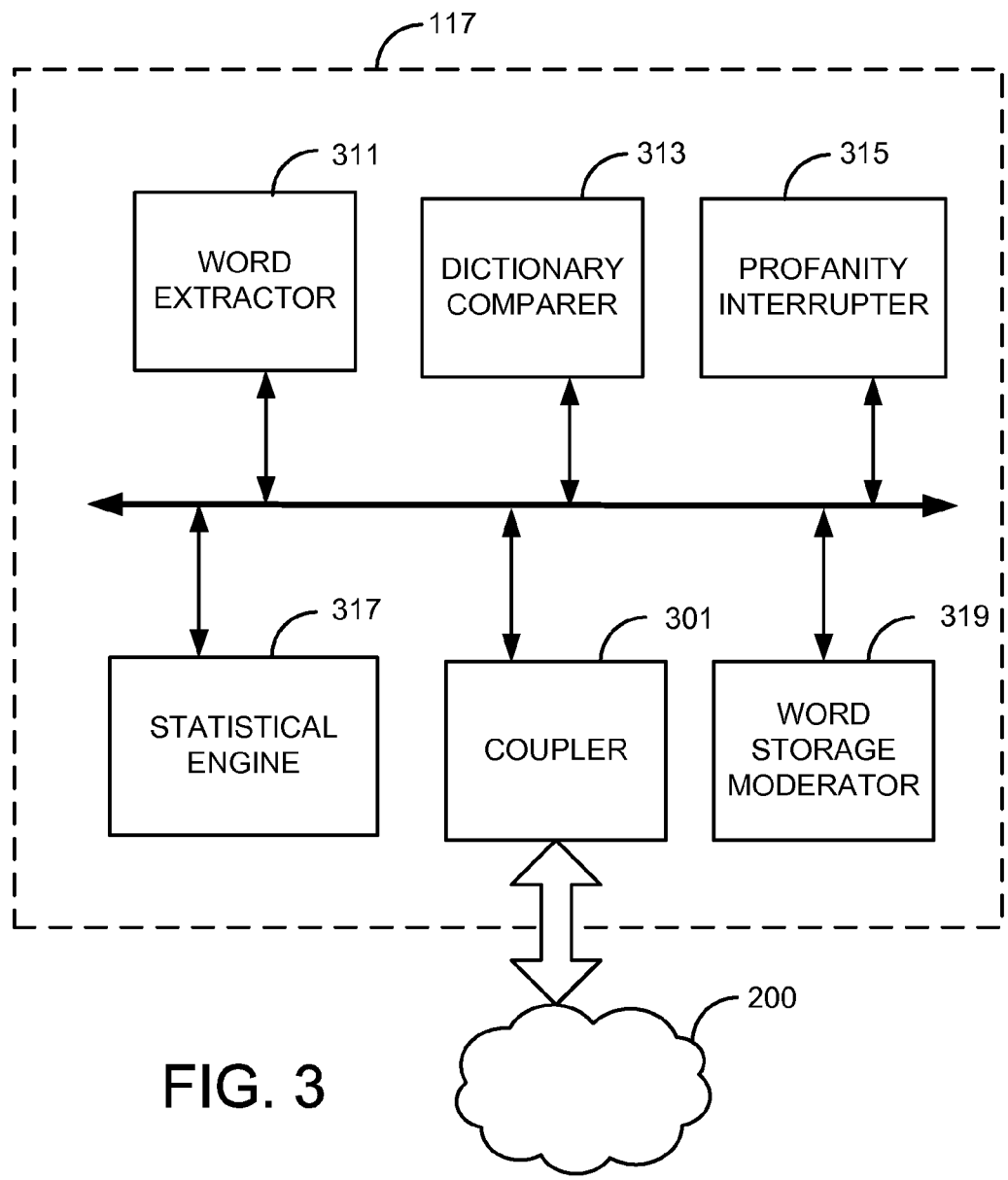
FIG. 3 shows a logical block diagram of a processor for the automated dictionary population system of FIG. 1.

FIG. 3 shows a logical block diagram of the Processor 117 for the Automated Dictionary Population System 100 of FIG. 1. The Coupler 301 may couple the Processor 117 to the other components of the Dictionary System 110, as illustrated by the Cloud 200. The Processor 117 may additionally include a Word Extractor 311, a Dictionary Comparer 313, a Profanity Interrupter 315, a Statistical Engine 317 and a Word Storage Moderator 319.

The Word Extractor 311 parses the messages and extracts words, where the Dictionary Comparer 313 then compares the extracted words to those already stored within the Dictionary Set 115. If a profanity is identified, the Profanity Interrupter 315 may perform an interruption to resolve the profanity.

The Statistical Engine 317 may provide word prediction during text entry, as well as the ability to determine phrases through identification of joined words.

The Word Storage Moderator 319 may direct the storage of new words within the Dictionary Set 115.

Figure 4:
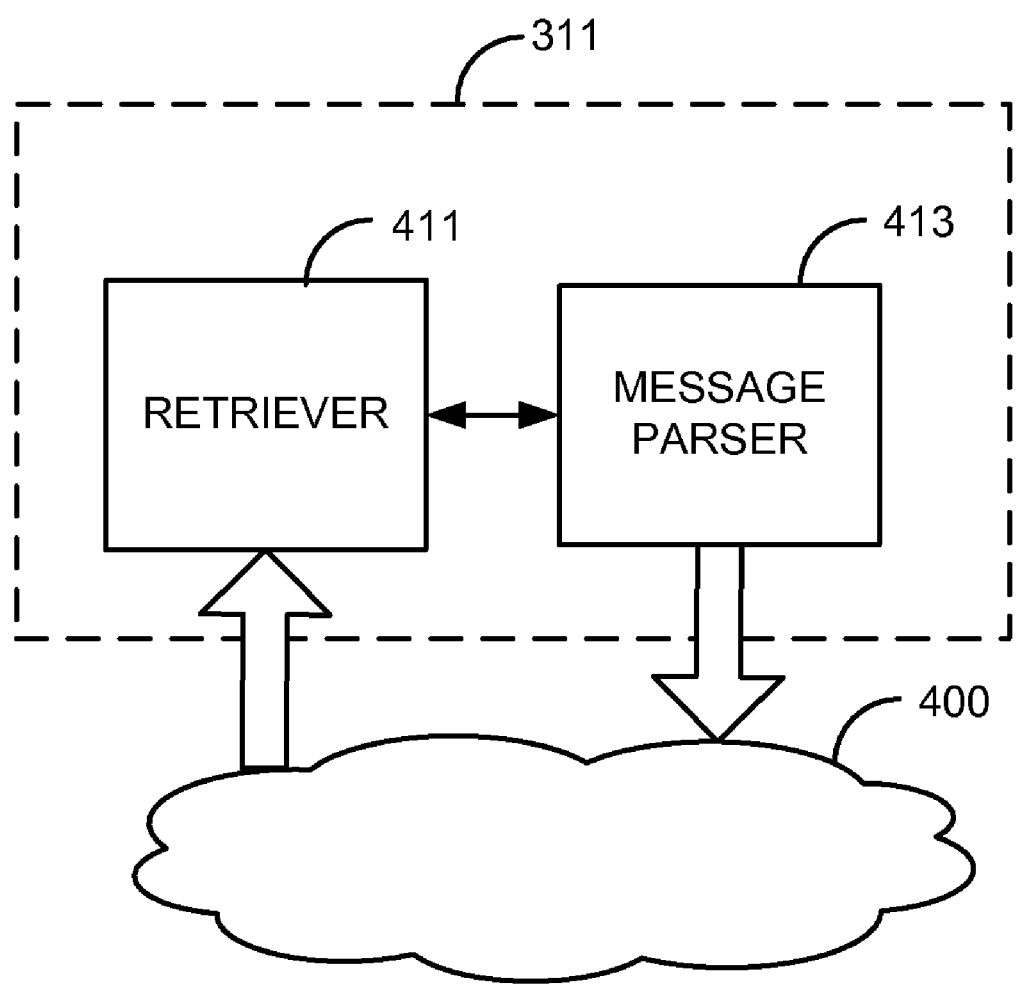
FIG. 4 shows a logical block diagram of a word extractor for the automated dictionary population system of FIG. 1.

FIG. 4 shows a logical block diagram of the Word Extractor 311 for the Processor 117 of FIG. 3. The Word Extractor 311 may include a Retriever 411 and a Message Parser 413 coupled to one another. Likewise, the Retriever 411 and Message Parser 413 may couple to the other components of the Processor 117, as illustrated by the Cloud 400.

The Retriever 411 may retrieve messages from the Message Storage 113 for analysis. Retrieval may be automated by a trigger, or by timing. For example, retrieval may occur when the User 101 opens a message for viewing. In this way the Dictionary System 110 may gain feedback from the User 101 in instances where clarification is desired. In some embodiments, message processing may be deferred when available power is below a certain threshold and a large amount of data may be present for processing. In such an instance, a particular message may be saved for later if User 101 feedback is desired. Dispute resolution may then be achieved through user intervention.

The Message Parser 413 may parse the message into individual words for the extraction. In some embodiments, the Message Parser 413 may also be configured to identify indicators of a phrase. In these embodiments, the Message Parser 413 may parse the individual words of the suspected phrase, as well as parse the entire intact phrase for analysis by the Statistical Engine 317.

Figure 5:
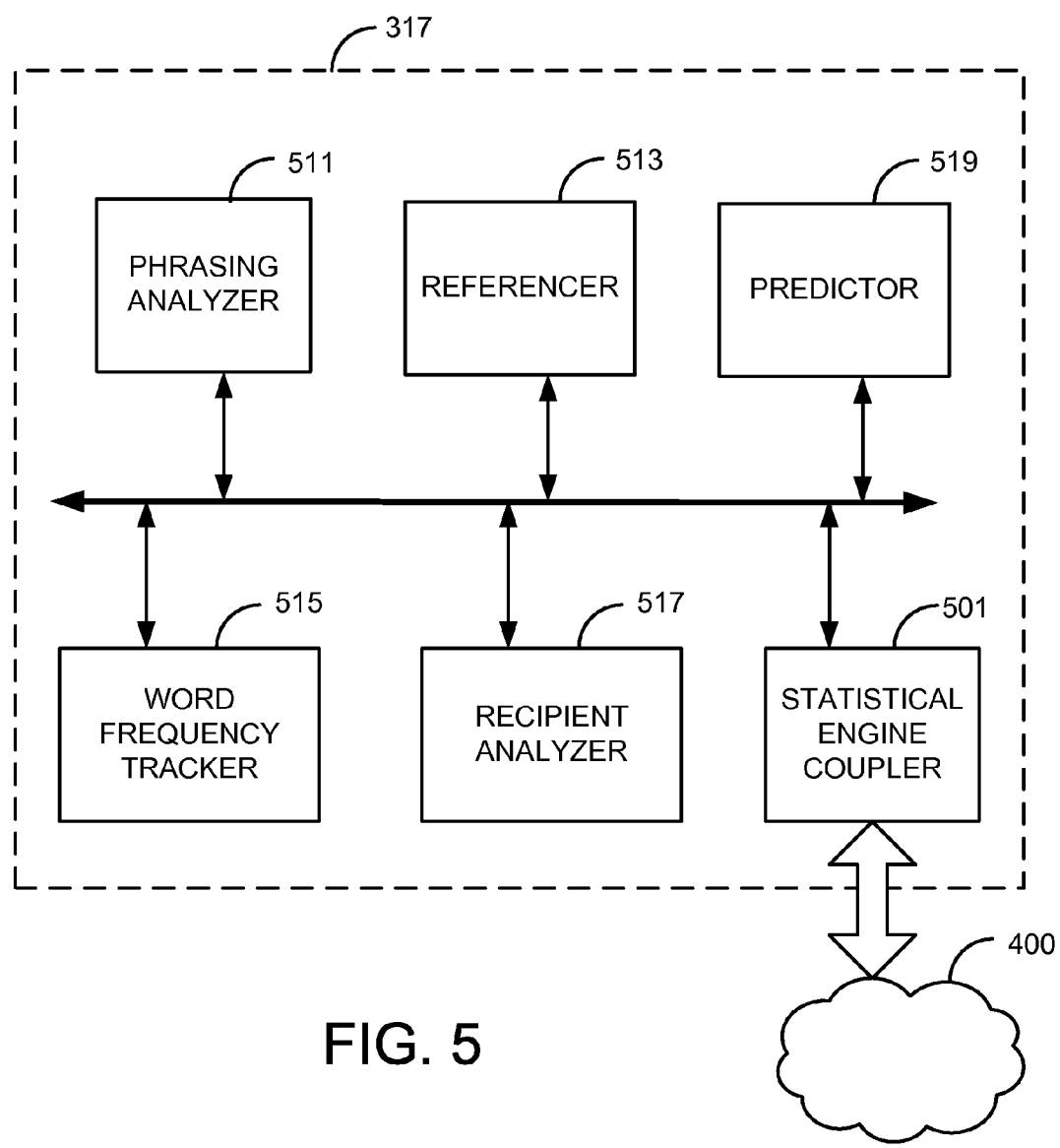
FIG. 5 shows a logical block diagram of a statistical for the automated dictionary population system of FIG. 1.

FIG. 5 shows a logical block diagram of the Statistical Engine 317 for the Processor 117 of FIG. 3. The Statistical Engine Coupler 501 may couple the Statistical Engine 317 to the other components of the Processor 117, as illustrated by the Cloud 400. The Statistical Engine 317 may additionally include a Phrasing Analyzer 511, a Referencer 513, a Word Frequency Tracker 515, a Recipient Analyzer 517 and a Predictor 519 each coupled to one another. The Word Frequency Tracker 515 may include tracking word use frequency and word recency.

The Phrasing Analyzer 511 may take the parsed language generated by the Message Parser 413 and identify the phrases. The Phrasing Analyzer 511 may also link particular words for later predictive processes.

The Predictor 519 predicts words for the creation of candidate word lists. In some embodiments, the Predictor 519 may use fuzzy logic in order to select the candidate word lists. Fuzzy logic is derived from fuzzy set theory dealing with reasoning that is approximate rather than precisely deduced from classical predicate logic. It can be thought of as the application side of fuzzy set theory dealing with well thought out real world expert values for a complex problem.

The Referencer 513 may reference words already located within the Dictionary Set 115, thereby eliminating the need for duplicate storage of words. Likewise, the Word Frequency Tracker 515 may keep track of the frequency of word usage. Again, by tracking frequency, multiple uses of a single word will still result in a single word entry within the Dictionary Set 115, thus saving storage resources. Also, the frequency of word use may be utilized by the Predictor 519 to generate candidate lists for the User 101 during text entry. The Word Frequency Tracker 515 may compile simple indicia of a word's gross usage and recency. By appending to a list, recency steps occur naturally, since when indexed from the end, backwards, the most recent words are identified. If a word occurs duplicatively, earlier in the process (closer to the front) this word can be de-referenced and, at a convenient time, the list may be shuffled or compacted to eliminate the earlier instance of a recent word. If needed, the list may be augmented by keeping a note of how often the word has been used.

In some embodiments, the Word Frequency Tracker 515 may provide a more detailed and useful analysis of frequency. For example, more advanced versions of the Word Frequency Tracker 515 may provide word frequency use when the message is directed toward a particular recipient. Likewise, in some embodiments, the Word Frequency Tracker 515 may generate multiple frequency indicia for a word, dependent upon the preceding word(s), general message content, sentence grammar or other variable. In this way, the Word Frequency Tracker 515 may generate a rich set of frequency statistics for a more refined, and ultimately more useful, word prediction by the Predictor 519. Complexity of the Word Frequency Tracker 515 may depend upon manufacturer's desires, and may consider storage and computation resources available to the Dictionary System 110.

The Recipient Analyzer 517 may analyze message recipient to generate data regarding word usage frequency by, or to, each recipient, and to also aid in the generation of recipient specific supplemental word lists of the Supplemental Dictionary 215.

Figure 6:
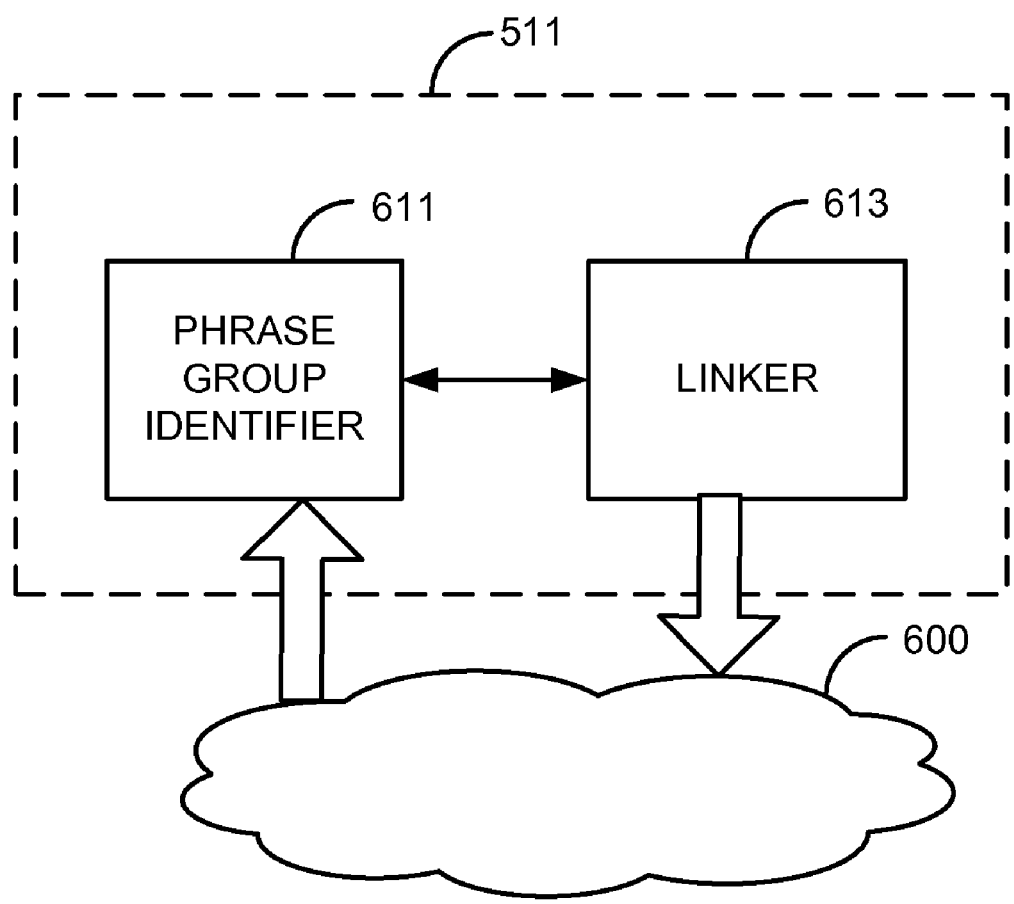
FIG. 6 shows a logical block diagram of a phrasing analyzer for the automated dictionary population system of FIG. 1.

FIG. 6 shows a logical block diagram of Phrasing Analyzer 511 for the Statistical Engine 317 of FIG. 5. The Phrasing Analyzer 511 may include a Phrase Group Identifier 611 and a Linker 613 coupled to one another. Likewise, the Phrase Group Identifier 611 and Linker 613 may couple to the other components of the Statistical Engine 317, as illustrated by the Cloud 600.

The Phrase Group Identifier 611 may identify words strings which form phrases. The Linker 613 may provide links for the words of the phrase so that the actual phrase need not be stored in its entirety.

When a group of adjacent words is parsed from the text message, if none are to be found in the main dictionary, they may be stored with additional information that allows them to remain linked. Two or more adjacent words may form a phrase or term of art or an associated word group. Words which precede or follow the group will generally be found in the main dictionary. Phrases may also be identified by explicit mean such as capitalization, quotation marks surrounding the phrase, by underlining or marking in a distinct way. This latter is common in Chinese; for example, where characters that are intended to be read as a single phrase, such as a name, may be underlined and thus conjoined. In alphabetic based languages, it is common to find joining words such as of or in, used along with capitalized words. For example, the Phrasing Analyzer 511 may receive Cost of Goods or Moreton-in-Marsh from the Message Parser 413, and the Phrasing Analyzer 511 may be configured to identify these word groups as related or associated word structures. These associations between words may be stored in a way that enables them to be easily recalled by the User 101.

Moreover, in certain dialects, the word "and" is a strong joining word feature. For example, the Cockney dialect of English has a strong "rhyming slang" format; "apples and pears" is used to substitute for "stairs" whereas "trouble and strife" would be used to mean "wife". By using semantic rules, it may be possible to detect relationships of this nature between words in a message. In some embodiments, any capitalized words separated by known "joining" words may be treated as a group.

Yet another form of entry, acronym and abbreviation, is identifiable by such word association. Common business terms are frequently referenced in acronymic form where the full name is several words long; thus COGS could be entered, and the phrase Cost of Goods returned. Another common example would be FAQS for Frequently asked Questions. The use of the "S" at the end of an acronym is often either redundant, being used as an aid to pronunciation, or used to denote a plural form and is a known case where it may be safely discarded in the matching process since if a full match is possible, it will occur in any case.

Figure 7:
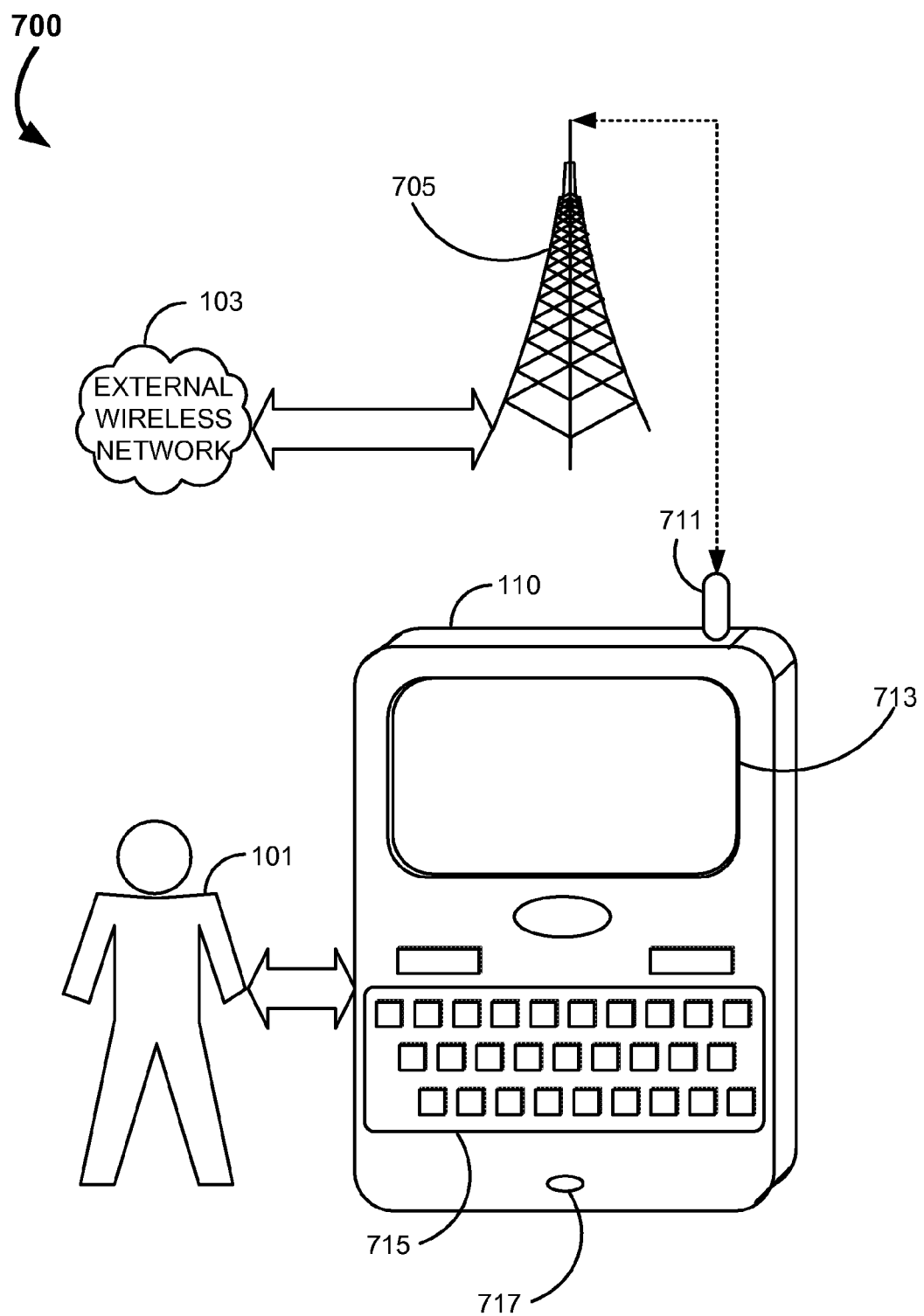
FIG. 7 shows an illustration of a mobile device in conjunction with a communication network in accordance with an embodiment of the present invention.

FIG. 7 shows an illustration of a user interaction with a wireless mobile device, shown generally at 700. In this exemplary illustration, the User 101 is seen interacting with a Dictionary System 110, which is, in this exemplary illustration, a mobile device. The Dictionary System 110, as embodied in the mobile device, includes a Display 713, Keypad 715 and Microphone 717, which collectively comprise the Interface 111 of the Dictionary System 110. The Keypad 715 in the exemplary illustration may include a non-deterministic, or ambiguous, keypad, or a deterministic style keypad. The Dictionary System 110 may be coupled, wirelessly, to the External Wireless Network 103 via a Wireless Receiver 705. In some embodiments, the Wireless Receiver 705 may include a Bluetooth adapter, radio tower, access point, or any other wireless signal intermediary.

It should be noted that the Dictionary System 110 may rely upon a wired connection to couple to the External Wireless Network 103. The intent of these exemplary illustrations, as seen in FIG. 7, is to show an exemplary variety of device configurations that the Automated Dictionary Population System 100 is designed for.

Figure 8:
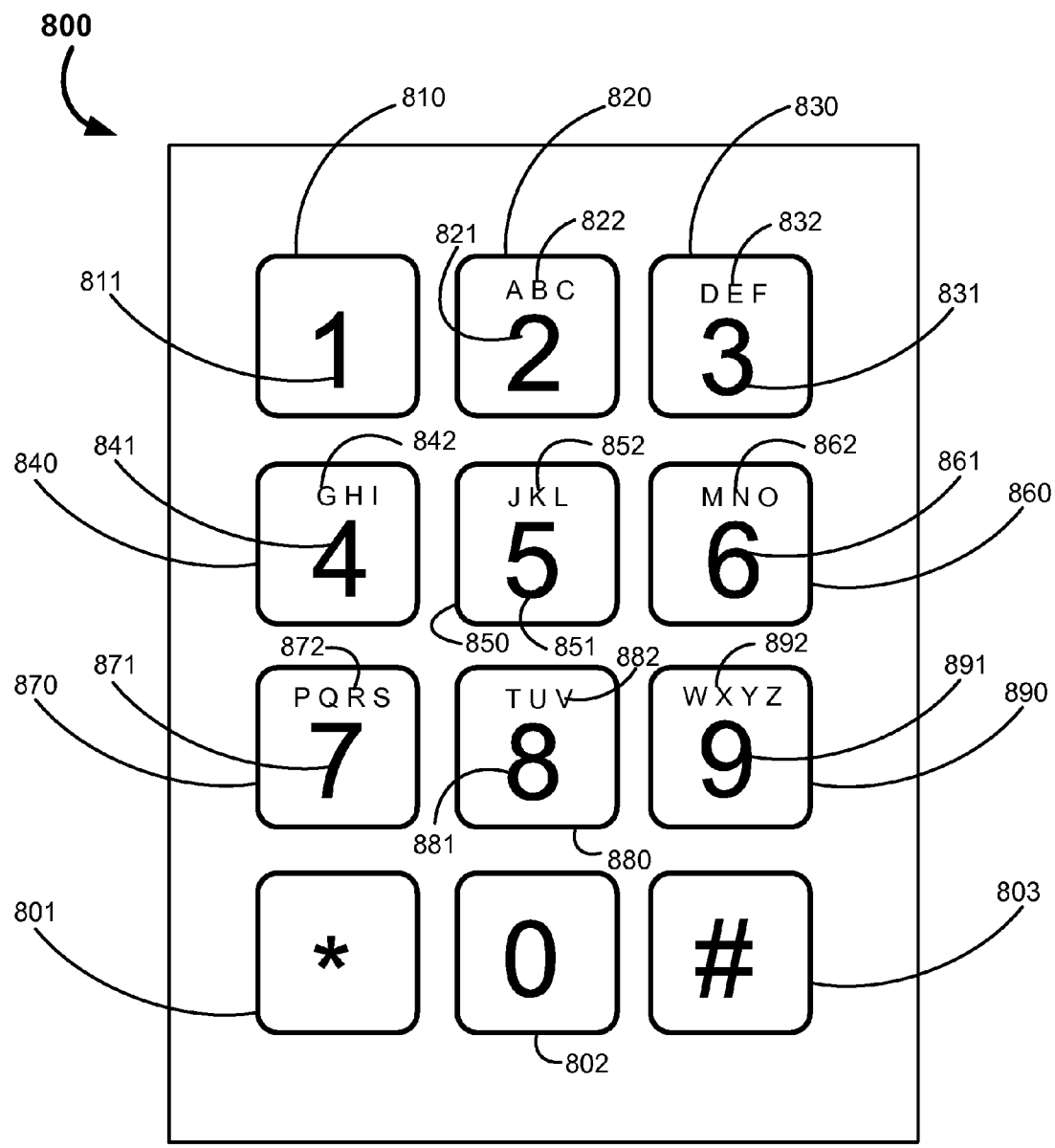
FIG. 8 shows an illustration of an ambiguous style keypad associated with the mobile device in accordance with an embodiment of the present invention.

FIG. 8 shows an illustration of an Ambiguous Style Keypad 800 associated with many mobile devices. Such a Keypad 800 may be often found upon phones and other devices with limited key space. In an ambiguous Keypad 800 each Numerical Key 810, 820, 830, 840, 850, 860, 870, 880, 890 contains both a Numeral 811, 821, 831, 841, 851, 861, 871, 881, 891, and a set of three or four Letters 812, 822, 832, 842, 852, 862, 872, 882, 892. As previously stated, the Letters 812, 822, 832, 842, 852, 862, 872, 882, 892 may be that of any language desired and is not limited to the Roman alphabet. The non-numeric Keys 801, 802 and 803 may likewise include characters and symbols, such as punctuation and spaces.

The Ambiguous Keypad 800 may rely upon the number of times any particular Numerical Key 810, 820, 830, 840, 850, 860, 870, 880, 890 is pressed to generate a specific letter, or character. Alternatively, in some embodiments, the device may interpret a string of key hits and disambiguate the intended letters. Lastly, in some embodiments, a combined system of multiple key hits and disambiguation may be utilized for text entry into an Ambiguous Keypad 800.

Figure 9:
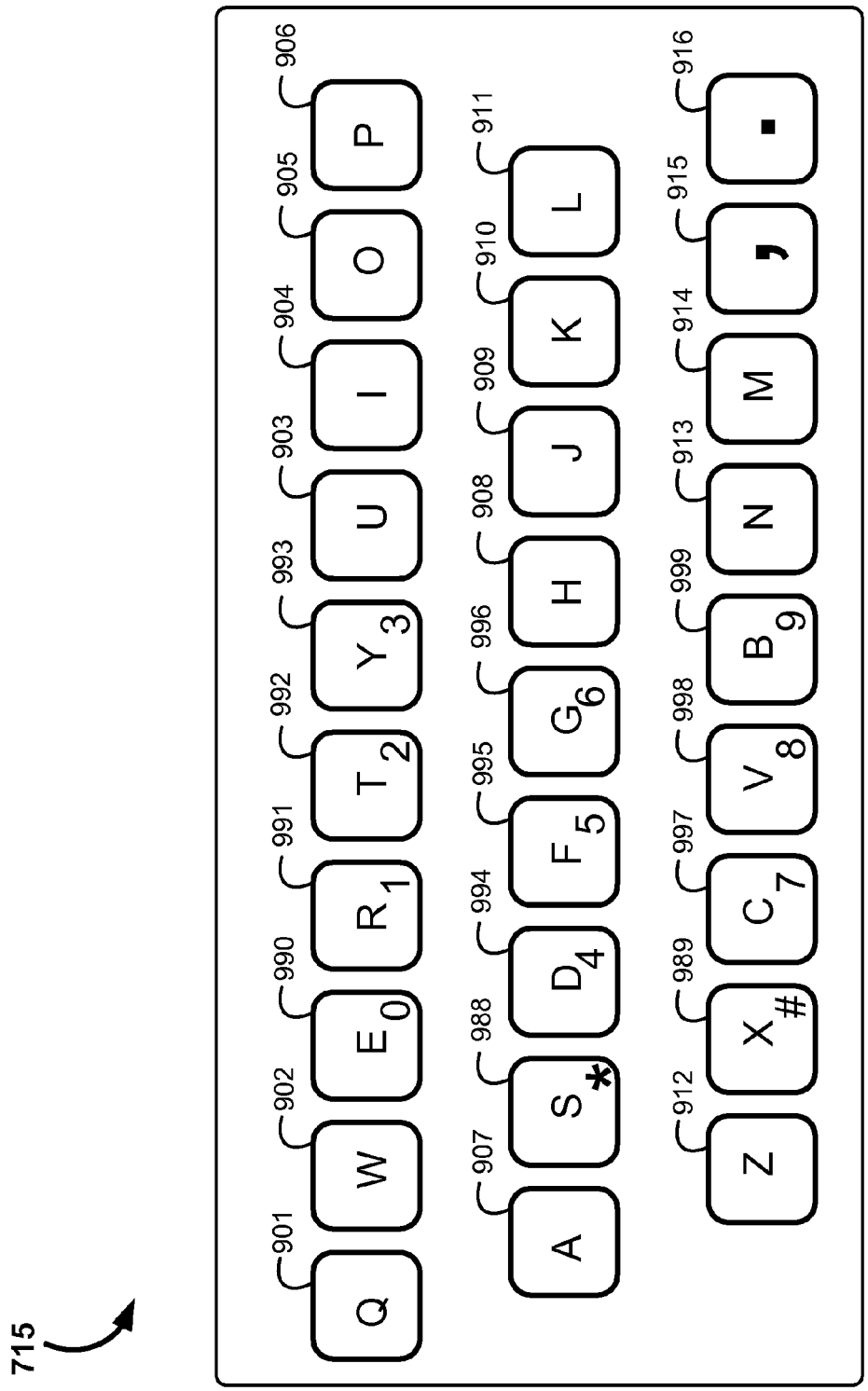
FIG. 9 shows an illustration of a deterministic style keypad associated with the mobile device in accordance with an embodiment of the present invention.

FIG. 9 shows an illustration of the Deterministic Keypad 715, or "full" keyboard, wherein the numerical inputs share a physical key with alphabetical inputs. The Deterministic Keypad 715 has one symbol per letter in the Latin set, and 12 keys are labeled with the numbers 0 through 9 and the characters * and # to correspond with the normal touch tone keys.

In this exemplary Deterministic Keypad 715, Dualistic Keys 988, 989, 990, 991, 992, 993, 994, 995, 996, 997 998 and 999 each provide numeric and alphabetic input. The remaining Alphabetic Keys, 901, 902, 903, 904, 905, 906, 907, 908, 909, 910, 911, 912, 913, 914, 915 and 916 provide only a single alphabetic character input.

III. Methods of Dictionary Population

Figure 10:
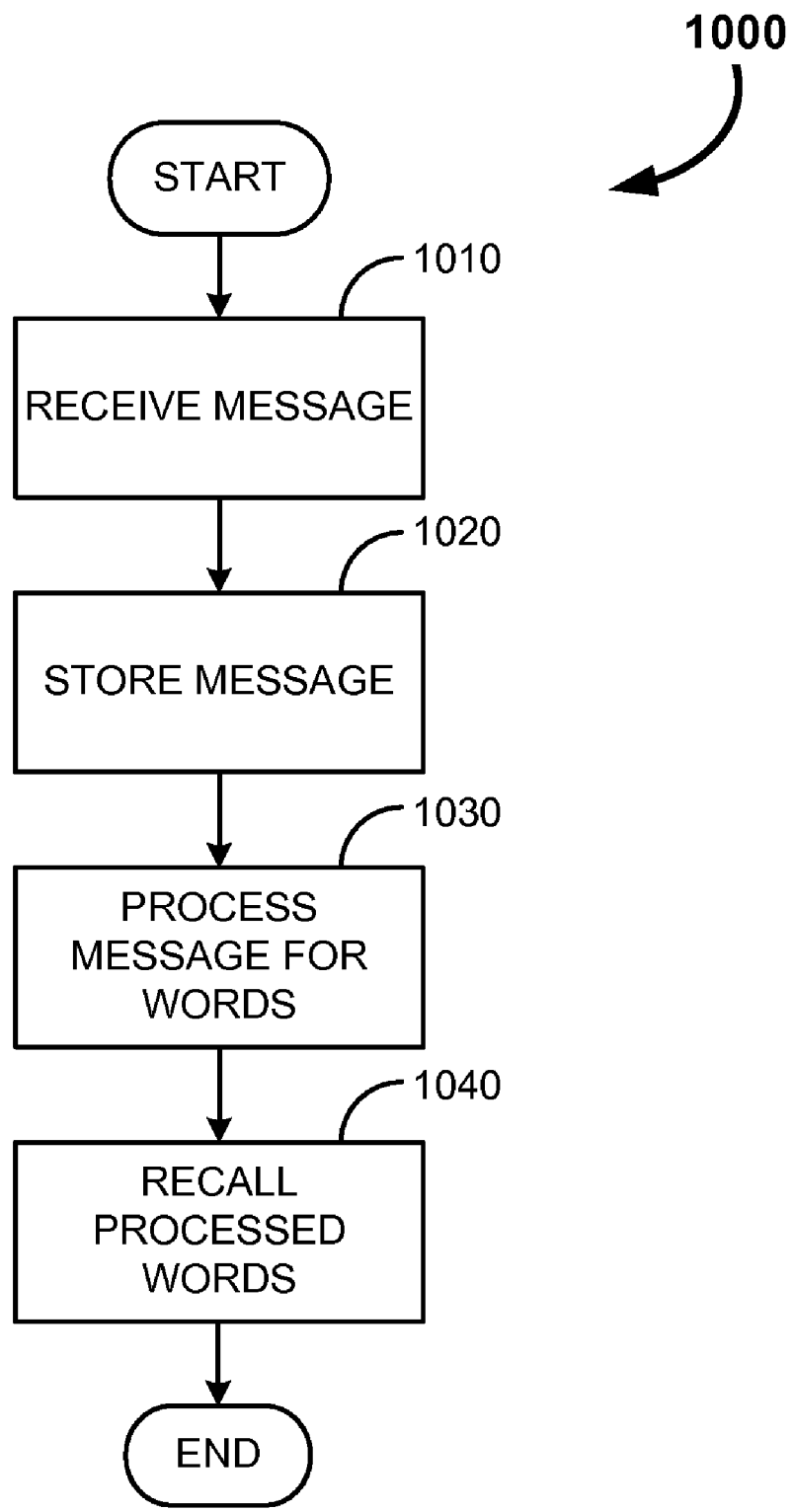
FIG. 10 shows a flow chart illustrating a process of automated dictionary population in accordance with an embodiment of the present invention.

FIG. 10 shows a flow chart illustrating a process of automated dictionary population, shown generally at 1000. The process begins and then progresses to step 1010 where the message is received. Messages may be received through the User 101 inputting a message on the Dictionary System 110.

Also, the Dictionary System 110 may receive a message from the External Wireless Network 103, such as an email or SMS.

The process then progresses to step 1020 where the message is stored. While it is conceivable that the Automated Dictionary Population System 100 may process messages upon receipt, thereby eliminating the need to store the message, it may be desirous to store the message until the User 101 interacts with the message so that the User 101 may be queried for feedback when necessary. The Message Storage 113 may store the message.

The process then progresses to step 1030 where the message is processed for dictionary population. The Processor 117 may perform the processing of the message. The details of message processing will be described in more detail below. Then, at step 1040, the words populating the dictionary may be recalled. This may occur during predictive word presentation as a candidate word to the User 101 during text input by the User 101. Prediction of words may utilize the Predictor 519. The process then ends.

Figure 11:
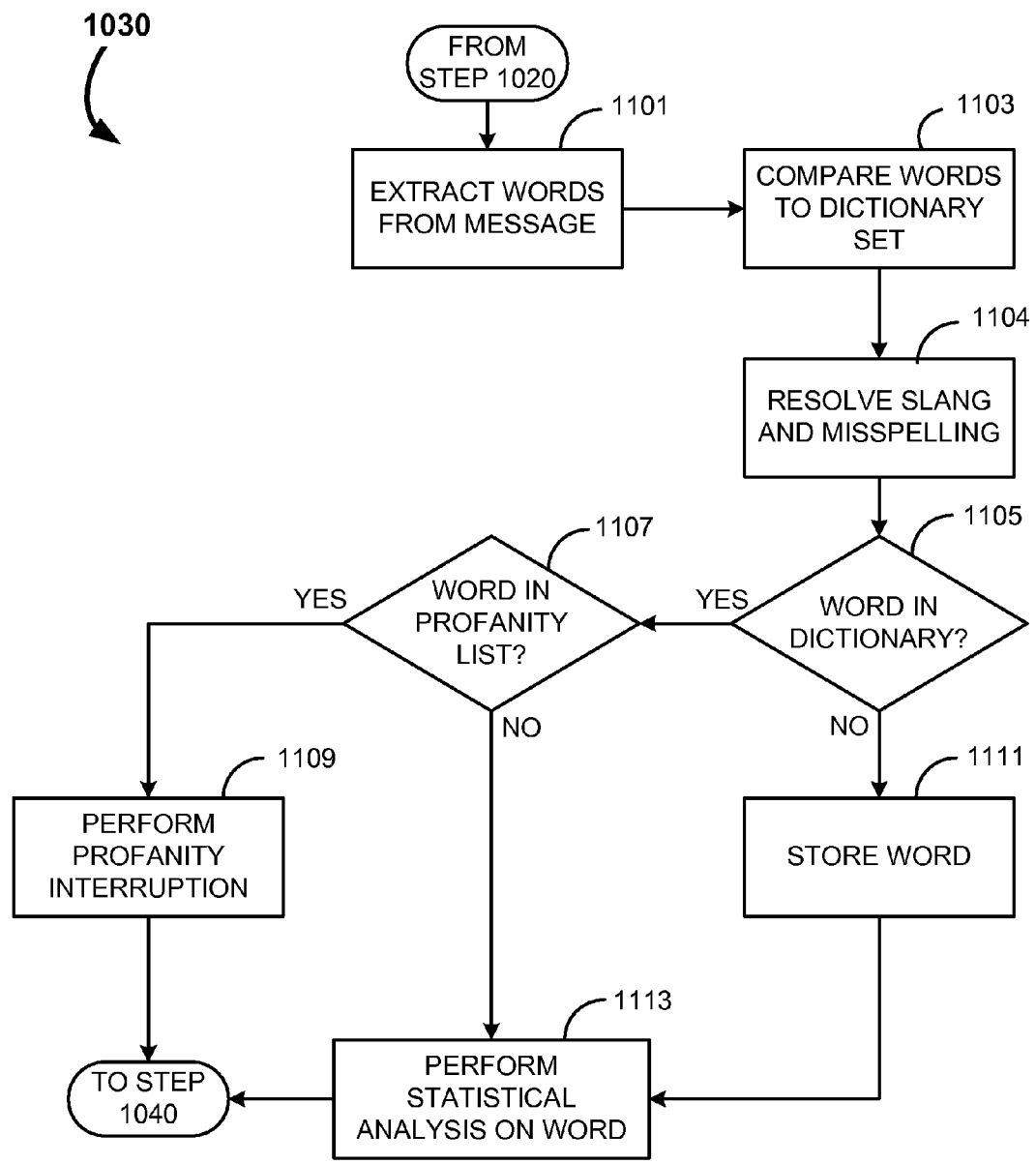
FIG. 11 shows a flow chart illustrating a process of message processing in accordance with an embodiment of the present invention.

FIG. 11 shows a flow chart illustrating a process of message processing, shown generally at 1030. The process begins from step 1020 of FIG. 10. The process then progresses to step 1101 where words are extracted from the message. Extraction may be performed by the Word Extractor 311. The process then progresses to step 1109 where the extracted words are compared against the words preexisting within the Dictionary Set 115. This function may be performed by the Dictionary Comparer 313.

The process then progresses to step 1104 where slang and misspelling is resolved through comparison to the Frequently Misspelled List 219. Additionally, dictionary error distance may be calculated for words, and those which have low error distances may be used to estimate which candidates are most likely to have been intended. Although this may prove disruptive to a user in the early stages, a simple query may be presented that allows the removal of erroneously stored words. This may be resolved simply by marking the word or word group when they are retrieved as candidates.

The process then progresses to step 1105 where an inquiry is made as to whether the word is found within the Dictionary Set 115. If the word is not yet stored within one of the dictionaries of the Dictionary Set 115, the process then progresses to step 1111 where the word is stored within the Supplemental Dictionary 215 by the Word Storage Moderator 319. Then, at step 1113, statistical analysis may be performed upon the newly stored word. Statistical analysis may utilize the Statistical Engine 317, and may include frequency analysis, sender analysis and additional statistical measures. The process then concludes by progressing to step 1040 of FIG. 10.

Else, if at step 1105, the word is found within the Dictionary Set 115, the process then progresses to step 1107 where an inquiry is made as to whether the word is found within the Profanity List 217. If the word is a profanity, the process then progresses to step 1109 where a profanity interruption process may be performed by the Profanity Interrupter 315. The process then concludes by progressing to step 1040 of FIG. 10.

Otherwise, if at step 1107 the word does not match an entry of the Profanity List 217, the process then progresses to step 1113 where statistical analysis may be performed upon the previously stored word. Statistical analysis may utilize the Statistical Engine 317, and may include frequency analysis, sender analysis and additional statistical measures. The process then concludes by progressing to step 1040 of FIG. 10.

Figure 12:
FIG. 12 shows a flow chart illustrating a process of word extraction in accordance with an embodiment of the present invention.
Figure 12:
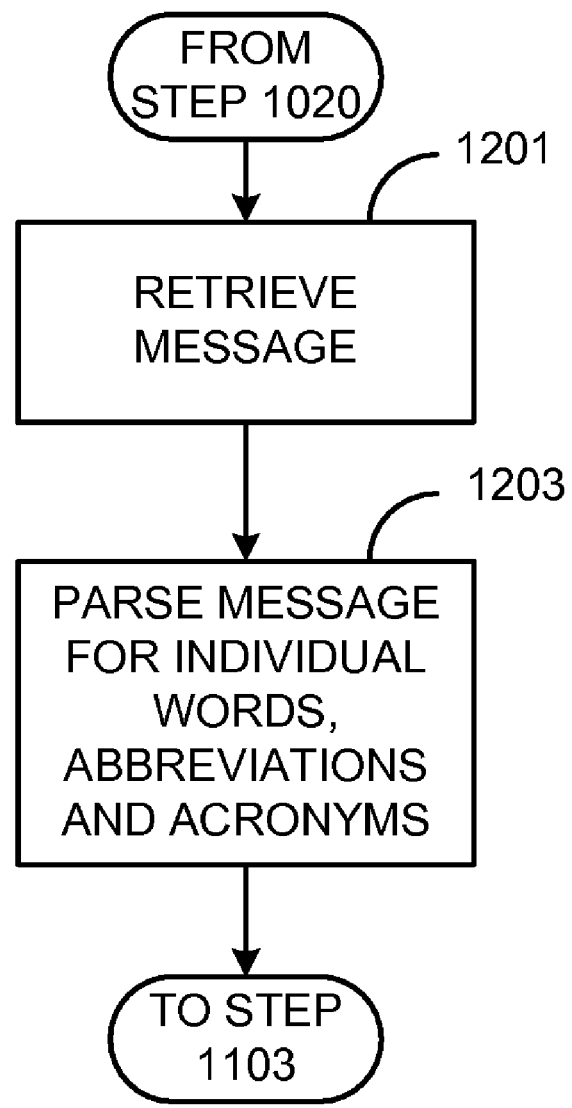

FIG. 12 shows a flow chart illustrating a process of word extraction, shown generally at 1101. The process begins from step 1020 of FIG. 10. The process then progresses to step 1201 where the message is retrieved from storage within the Message Storage 113. Retrieval may utilize the Retriever 411. In some embodiments, retrieval may be initiated when there is a triggering event, such as connection of the Dictionary System 110 to an external power source, or the opening of a message by the User 101.

The process then progresses to step 1203 where the message is parsed for individual words. Parsing may utilize the Message Parser 413. The process then concludes by progressing to step 1103 of FIG. 11.

Figure 13:
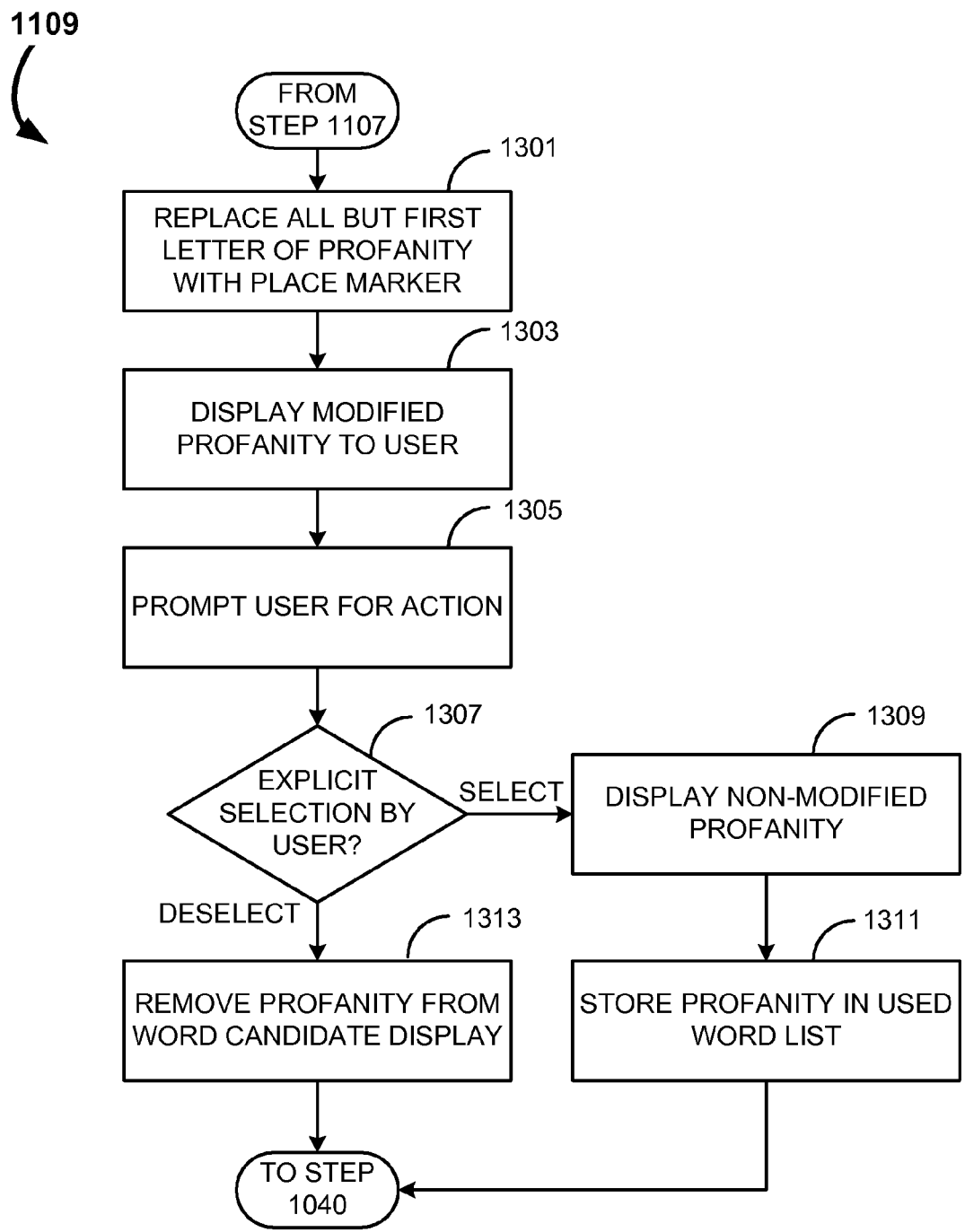
FIG. 13 shows a flow chart illustrating a process of profanity interruption in accordance with an embodiment of the present invention.

FIG. 13 shows a flow chart illustrating a process of profanity interruption, shown generally at 1109. A common problem with personal communications is that the informality leads to the propagation of written messages whose content may be profane or laden with expletives. Seemingly sane users may cast caution to the wind, assuming that the message is private and will not be shared. The consequence of this invention is that obscenities may be gathered unwittingly and lead to embarrassment if someone other than the owner attempts to use the appliance.

The process begins from step 1107 of FIG. 11. The process then progresses to step 1301 where some portion of the profanity is replaced by some place marker. In some embodiments, all but the first letter of the profanity may be replaced by asterisks. In some alternate embodiments, only vowels are replaced. Place markers may be any symbol desired, such as the pound symbol (#), an asterisk symbol (*), exclamation marks (!) or any other desired symbol. This modified profanity may then be displayed to the User 101 at step 1303.

The intent in modifying the profanity in this way is to avoid offending the delicate User 101. However, the User 101 may have intended to use the profanity, so it is equally important that this word selection be provided in a candidate word listing. Moreover, by modifying the profanity, the User 101 may rethink its usage, and avoid flippant use of words which may cause interpersonal or business relationship harm. The User 101 may be prompted for an action at step 1305.

The process then progresses to step 1307 where an inquiry is made as to whether the User 101 explicitly selects the modified profanity as the intended word. If the user makes such an explicit selection of the modified profanity, the word may be shown to the User 101 as an unmodified word at step 1309. The profanity may also be added to the Used Word List 213 at step 1311. In some embodiments, the word may be linked to a particular recipient, so that in future uses of the word it will still be treated as a profanity in most scenarios, but be treated as a regular word when used with "familiar" or "informal" contacts. The process then concludes by progressing to step 1040 of FIG. 10.

Else, if at step 1313 the User 101 does not explicitly select the profanity from the candidate word listing, the modified profanity may be removed from the candidate word listing. The process then concludes by progressing to step 1040 of FIG. 10.

Figure 14:
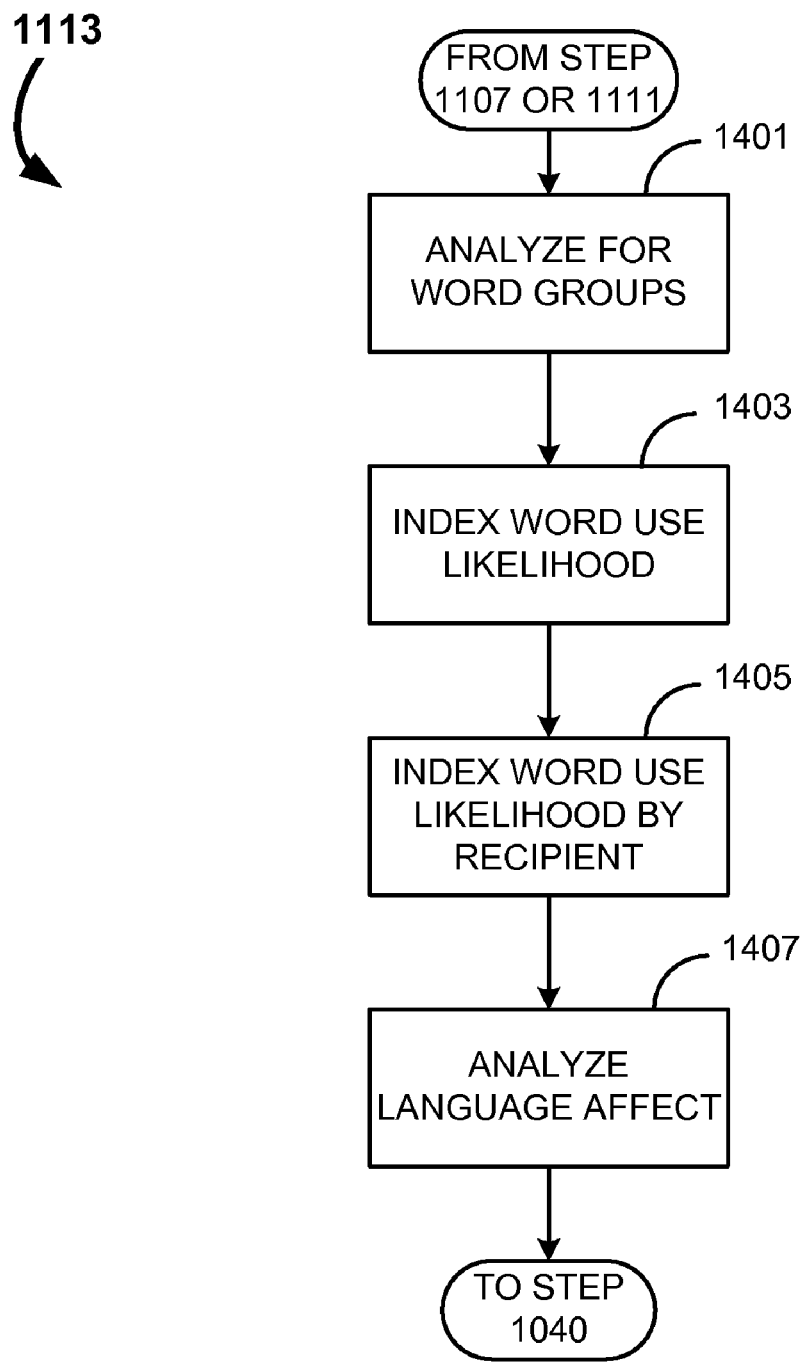
FIG. 14 shows a flow chart illustrating a process of statistical analysis of words in accordance with an embodiment of the present invention.

FIG. 14 shows a flow chart illustrating a process of statistical analysis of words, shown generally at 1113. The process begins from step 1107 or 1111 of FIG. 11. The process then progresses to step 1401 where the Phrasing Analyzer 511 analyzes the message for word groups.

The process then progresses to step 1403 where word use likelihood, including frequency and recency, may be indexed by the Word Frequency Tracker 515. By indexing word use, the Automated Dictionary Population System 100 eliminates the need to repetitively store multiple copies of a particular word in the Dictionary Set 115. Also, these indices may be of particular use in the generation of predictive candidate word lists. Frequency tracking may be a simple count of word use, or may, in some embodiments, involve more sophisticated tracking of word use by sentence structure, message content, proximate words, or intended recipient.

One such index is illustrated at step 1405, where word use likelihood is indexed by recipient. The verbiage utilized when speaking to one's lover, mother, friend or business associate may vary greatly. By linking word use frequency by recipient, predictive candidate lists may be more finely tuned when writing a message to a known recipient.

The process then progresses to step 1407 where language is analyzed for affect; that is, the emotional effect invoked by the message. Particular words or phrases may be identified which denotes particular emotional response. Likewise, particular grammar may also denote mood of the message. For example, speech patterns directed to a teen friend, versus a parent or employer may be identified. Monitoring affection in the language may be particularly useful in generation of candidate word lists. The process then concludes by progressing to step 1040 of FIG. 10.

Figure 15:
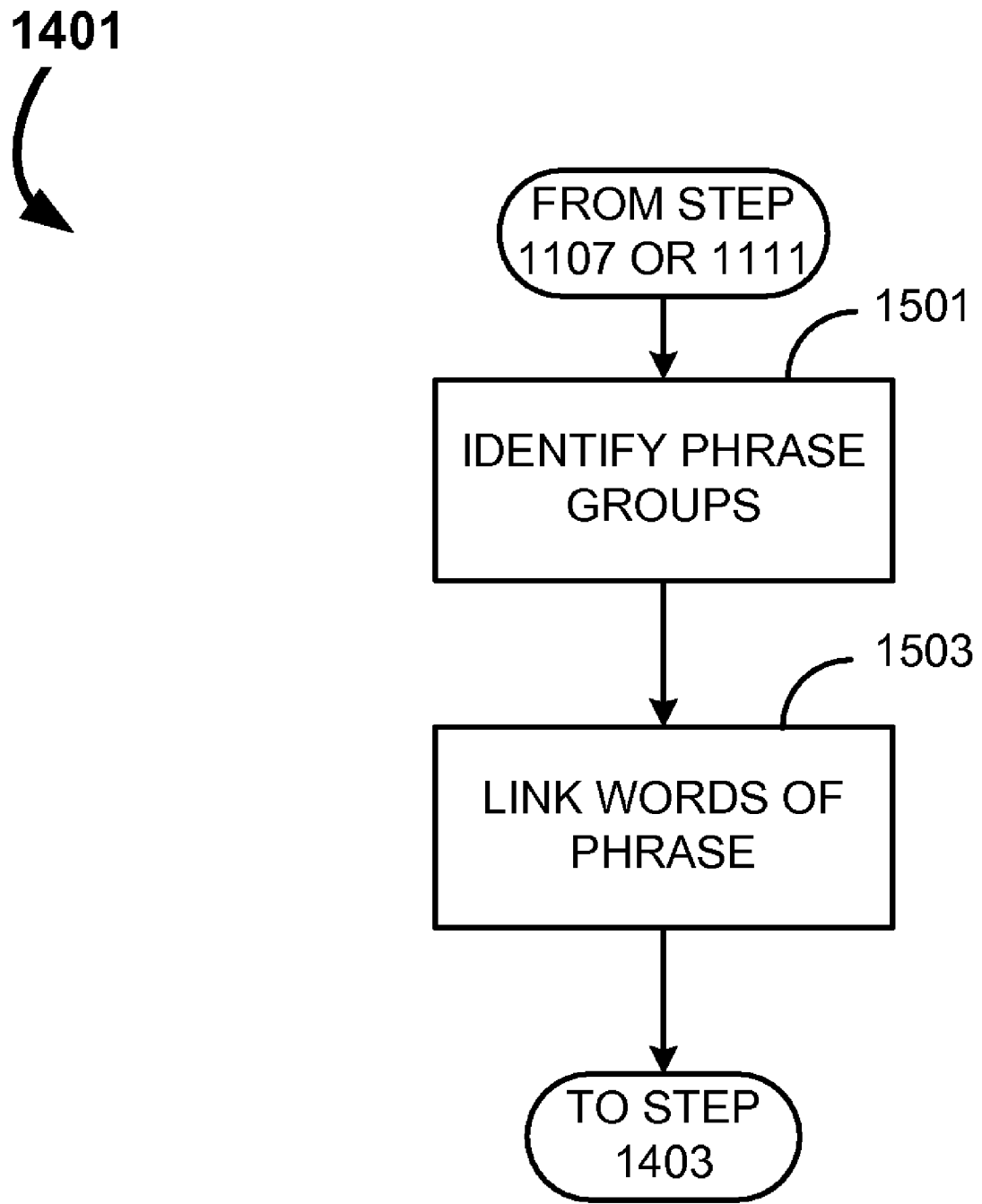
FIG. 15 shows a flow chart illustrating a process of analysis for word groups in accordance with an embodiment of the present invention.

FIG. 15 shows a flow chart illustrating a process of analysis for word groups, shown generally at 1401. The process begins from step 1107 or 1111 of FIG. 11. The process then progresses to step 1501 where the Phrase Group Identifier 611 identifies phrase groups. As noted earlier, when a group of adjacent words is parsed from the text message, if none are to be found in the main dictionary, they may be stored with additional information that allows them to remain linked. Two or more adjacent words may form a phrase or term of art or an associated word group. Words which precede or follow the group will generally be found in the main dictionary. Phrases may also be identified by explicit mean such as capitalization, quotation marks surrounding the phrase, by underlining or marking in a distinct way. Likewise, certain words are considered to be "joining" words. It is not unusual to have related words located either side of the joining words. Examples would be "of" and "in". Additionally, acronyms which stand for a particular phrase (such as FAQS) may likewise be identified.

The process then progresses to step 1503 where the Linker 613 links the words identified as a phrase. By providing linking indicators, the Automated Dictionary Population System 100 minimizes the need to store each phrase separately. Instead, where the phrase includes words found in the Dictionary Set 115, each of the already stored words may further include links to generate the phrase. This enables conservation of storage resources. The process then concludes by progressing to step 1403 of FIG. 14.

Figure 16:
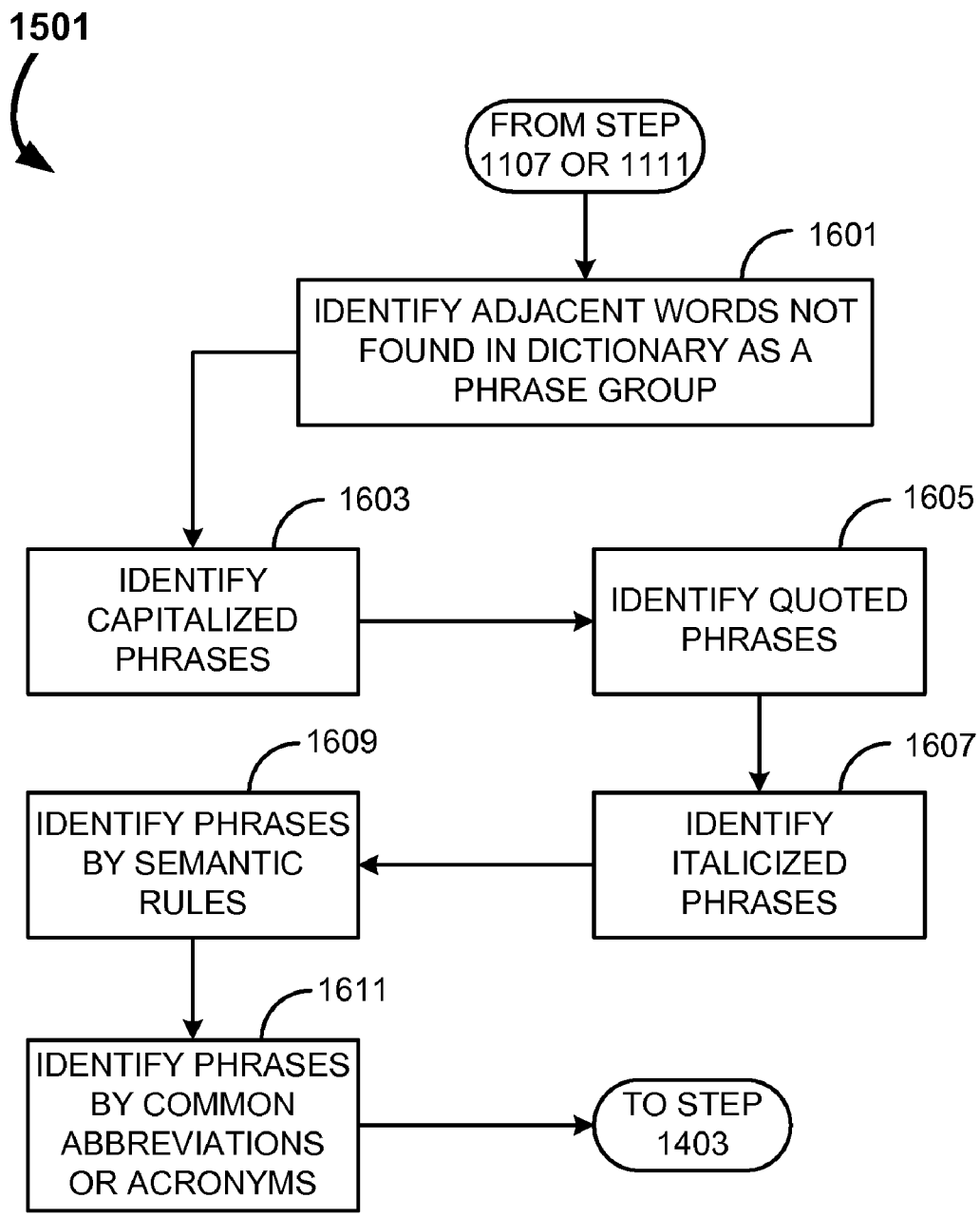
FIG. 16 shows a flow chart illustrating a process of identifying phrase groups in accordance with an embodiment of the present invention.

FIG. 16 shows a flow chart illustrating a process of identifying phrase groups, shown generally at 1501. The process begins from step 1107 or 1111 of FIG. 11. The process then progresses to step 1601 where adjacent words not found in the Dictionary Set 115 are identified as a potential phrase group. If additional indications of a phrase are present, such as capitalization, quotes or joining words, then the system may automatically save the word string as a phrase. If there are no other indications that the word string is a phrase, the system may query the User 101 to resolve the ambiguity.

The process then progresses to step 1603 where capitalized phrases are identified. Likewise, at step 1605 quoted phrases are identified; and at step 1607 italicized phrases are identified. The process then progresses to step 1609 where semantic rules may be utilized to determine phrases. Such semantic analysis may include identifying "joining words" and particular rhyme or cadence associated with phrases. Often the User 101 may be queried to resolve ambiguities on whether a particular set of words includes a phrase.

The process then progresses to step 1611 where common abbreviations and acronyms which designate phrases are identified. As noted, these are common in business settings; however, such "shorthand" is likewise becoming increasingly common during casual messaging with terms such as "lol", "bff" and "cul8tr". The process then concludes by progressing to step 1403 of FIG. 14.

In sum the present invention relates generally to automated dictionary generation system and method to provide fast, accurate and resource efficient population of personalized dictionaries. Additionally, this rapid dictionary population enhances early use of a mobile device, provide comprehensive profanity protection and aids in rapid text input on a mobile device. In this way the automated dictionary generation system and method may provide an invaluable tool for device manufacturers and device users.

While this invention has been described in terms of several preferred embodiments, there are alterations, modifications, permutations, and substitute equivalents, which fall within the scope of this invention. For example, the present invention may be embodied as all software, all hardware, or some combination thereof. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

The invention claimed is:

1. A computer implemented method for automated dictionary population, useful in association with a personal appliance including at least one dictionary which includes entries, the method for automated dictionary population comprising:
   retrieving a message containing words, wherein the message is received by the personal appliance;
   parsing the words of the message;
   comparing the parsed words to the entries of the at least one dictionary, wherein the comparing identifies new words of the parsed words which are not found within the at least one dictionary;
   generating statistical information for the parsed words;
   identifying phrases from the parsed words by identifying phrase markers, wherein the phrase markers include at least one of italicized word groups, quoted word groups, bolded word groups, capitalized word groups, and word groups containing more than one new word;
   linking the words of the identified phrases and storing the linking of the words of the identified phrases with additional information that allows them to remain linked without storing the entire identified phrases; and
   storing the new words within at least one of the at least one dictionary, wherein the storing the new words enables recall of the new words for generating a candidate word list.

2. The method of automated dictionary population, as recited in claim 1, further comprising processing profanities, wherein the processing profanities comprises:
   identifying profanities within the parsed words by comparing the parsed words to a profanity word list;
   modifying the profanities by replacing at least some of the profanity with a place marker;
   displaying the modified profanity to a user in a candidate list;
   requesting feedback from the user;

receiving user feedback, wherein the feedback includes selection and de-selection of the profanities, wherein de-selection of the profanity may be at least one of explicit and implicit;
if the feedback includes selection of the profanities:
then, displaying the profanity to the user; and
storing the profanities;
else, if the feedback includes de-selection of the profanities:
then, removing the profanities from the candidate list.

3. The method of automated dictionary population, as recited in claim 1, wherein the parsing and comparing of the words is performed as each word is retrieved.

4. The method of automated dictionary population, as recited in claim 1, wherein the storing the new words includes preserving the generated statistical information.

5. The method of automated dictionary population, as recited in claim 4, wherein the generated statistical information includes at least one of word usage frequency, recency, or likelihood of use.

6. The method of automated dictionary population, as recited in claim 1, wherein retrieval occurs when a user accesses a received message.

7. The method of automated dictionary population, as recited in claim 1, wherein the message includes at least one of text messages, voice messages, embedded audio feeds and video data.

8. An automated dictionary system, useful in association with a personal appliance including at least one dictionary which contains entries, the automated dictionary system comprising:
a retriever configured to retrieve a message containing words, wherein the message is received by the personal appliance;
a message parser configured to parse the words of the text message;
a dictionary comparator configured to compare the parsed words to the entries of the at least one dictionary, wherein the dictionary comparer is further configured to identify new words of the parsed words which are not found within the at least one dictionary;
a statistical analyzer configured to generate statistical information for the parsed words;
a phrase group identifier configured to identify phrases from the parsed words by identifying phrase markers, wherein the phrase markers include at least one of italicized word groups, quoted word groups, bolded word groups, capitalized word groups, and word groups containing more than one new word, said phrase group identifier further configured to apply semantic rules to identify phrases from the parsed words by identifying word groups that include joining words and further comprising a linker configured to link the words of the identified phrases; and
a word storage moderator configured to store the new words within at least one of the at least one dictionary, wherein the storing the new words enables recall of the new words for generating a candidate word list, and wherein the word storage moderator is further configured to store the linkage of the words of the identified phrases with additional information that allows them to remain linked without storing the entire identified phrases.

9. The automated dictionary system of claim 8, further comprising a profanity interrupter configured to identify profanities within the parsed words by comparing the parsed words to a profanity word list, modify the profanities by replacing at least some of the profanity with a place marker, display the modified profanity to a user in a candidate list, request feedback from the user, receive user feedback wherein the feedback includes selection and de-selection of the profanities, wherein de-selection of the profanity may be at least one of explicit and implicit, and if the feedback includes selection of the profanities then displaying the profanity to the user and storing the profanities, else, if the feedback includes de-selection of the profanities then removing the profanities from the candidate list.

10. The automated dictionary system of claim 8, wherein the parsing and comparing of the words is performed as each word is retrieved.

11. The automated dictionary system of claim 8, wherein the word storage moderator is further configured to preserve the generated statistical information.

12. The automated dictionary system of claim 11, wherein the generated statistical information includes at least one of word usage frequency, recency, or likelihood of use.

13. The automated dictionary system of claim 8, wherein the retriever is configured to initiate retrieval when a user accesses the received message.

14. The automated dictionary system of claim 8, wherein the message includes at least one of text messages, voice messages, embedded audio feeds and video data.

15. A computer implemented method for automated dictionary population, useful in association with a personal appliance including at least one dictionary which includes entries, the method for automated dictionary population comprising:
retrieving a message containing words, wherein the message is received by the personal appliance;
parsing the words of the message;
comparing the parsed words to the entries of the at least one dictionary, wherein the comparing identifies new words of the parsed words which are not found within the at least one dictionary;
generating statistical information for the parsed words;
applying semantic rules to identify phrases from the parsed words by identifying word groups that include joining words;
linking the words of the identified phrases and storing the linking of the words of the identified phrases with additional information that allows them to remain linked without storing the entire identified phrases; and
storing the new words within at least one of the at least one dictionary, wherein the storing the new words enables recall of the new words for generating a candidate word list.

16. The method of automated dictionary population, as recited in claim 15, wherein the message includes at least one of text messages, voice messages, embedded audio feeds and video data.

* * * * *